(12) United States Patent
Hoffer, Jr.

(10) Patent No.: US 8,628,014 B1
(45) Date of Patent: Jan. 14, 2014

(54) LIGHT FIELD INSTRUCTION SYMBOL IDENTIFIER AND METHOD OF USE

(76) Inventor: John M. Hoffer, Jr., Bel Air, MD (US)

( * ) Notice: Subject to any disclaimer, the term of this patent is extended or adjusted under 35 U.S.C. 154(b) by 0 days.

(21) Appl. No.: 13/471,456

(22) Filed: May 15, 2012

(51) Int. Cl.
*G06K 7/10* (2006.01)

(52) U.S. Cl.
USPC ............. 235/462.01; 235/462.2; 235/462.23; 235/462.35; 235/462.45; 705/15

(58) Field of Classification Search
USPC ................. 235/462.01, 462.1, 462.2, 462.23, 235/462.35, 462.45; 705/15; 396/113
See application file for complete search history.

(56) References Cited

U.S. PATENT DOCUMENTS

| | | | | |
|---|---|---|---|---|
| 8,238,738 | B2 * | 8/2012 | Georgiev | 396/113 |
| 8,308,067 | B1 * | 11/2012 | Ratner | 235/462.01 |
| 2002/0150450 | A1 * | 10/2002 | Bevirt et al. | 414/225.01 |
| 2005/0269405 | A1 * | 12/2005 | Throckmorton et al. | 235/383 |
| 2007/0081211 | A1 * | 4/2007 | Tange et al. | 359/24 |
| 2009/0152348 | A1 * | 6/2009 | Ostrowski et al. | 235/383 |
| 2010/0141802 | A1 * | 6/2010 | Knight et al. | 348/240.3 |
| 2013/0033636 | A1 * | 2/2013 | Pitts et al. | 348/340 |
| 2013/0161399 | A1 * | 6/2013 | He et al. | 235/462.41 |

OTHER PUBLICATIONS

WO 02/073953 A2 Sep. 2002 Hennick et al.*

* cited by examiner

*Primary Examiner* — Steven S Paik
*Assistant Examiner* — Asifa Habib

(57) ABSTRACT

An instruction symbol identifier comprising a digital imaging capturing features that utilizes a light field sensor to capture the intensity and direction of incident light is described. The instruction symbol identifier comprises a computing device, whereby a digitally captured image may be digitally focused to identify an instruction symbol. An instruction symbol identifier is described being coupled to a point of sale counter, whereby product bar codes may be identified more quickly and effectively than conventional bar code scanners. A light emitting feature and an image locator feature are described, to further enhance capturing an image.

22 Claims, 6 Drawing Sheets

FIG. 3A
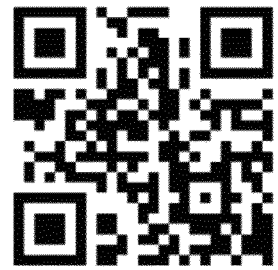
FIG. 3B
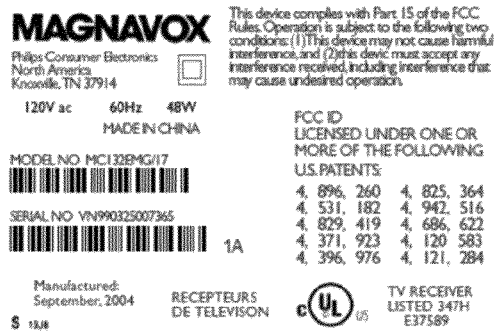
FIG. 3C
FIG. 3D
FIG. 3E
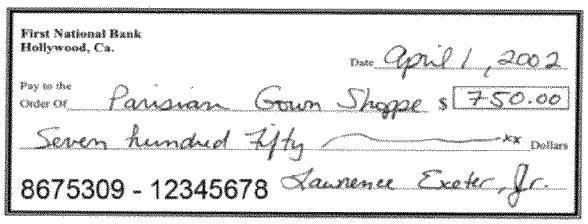
FIG. 3F
FIG. 3G

LIGHT FIELD INSTRUCTION SYMBOL IDENTIFIER AND METHOD OF USE

BACKGROUND OF THE INVENTION

1. Field of the Invention

The present invention relates to an instruction symbol identifier comprising a light field sensor.

2. Background

Conventional instruction symbol identifiers, such as point of display check out scanners, for measuring universal product codes UPC, require the correct positioning of the product code over the scanner for it to register. A product often has to be move back and forth over the scanner multiple times and oriented a number of times before the scanner registers the product code. In some cases, the scanner cannot discern the UPC code and the code has to be manually entered into the register. This wastes time and money and frustrates customers and employees.

There exists a need for an instruction symbol identifier that can quickly and more reliably identify an instruction symbol and is more tolerant of instruction symbol position and orientation.

SUMMARY

As described in dissertation entitled "DIGITAL LIGHT FIELD PHOTOGRAPHY" by Ren Ng, July 2006, incorporated by reference herein, light field sensor photography enables a digital image to be computational focused rather than optically focused. A plenoptic camera as described in the dissertation comprises an array of micro-lenses configured over a photosensor. With this configuration, the light intensity, color and direction are recorded and an image focused over a range of focal lengths can be computed from the data. A light field sensor captures the sum of light rays at each pixel, but also captures the angle of approach of the various rays effectively capturing 3-D information about the image.

As stated in Ren Ng's dissertation:

"To record the light field inside the camera, digital light field photography uses a microlens array in front of the photosensor. Each microlens covers a small array of photosensor pixels. The microlens separates the light that strikes it into a tiny image on this array, forming a miniature picture of the incident lighting. This samples the light field inside the camera in a single photographic exposure. A microlens should be thought of as an output image pixel, and a photosensor pixel value should be thought of as one of the many light rays that contribute to that output image pixel.

To process final photographs from the recorded light field, digital light field photography uses ray-tracing techniques. The idea is to imagine a camera configured as desired, and trace the recorded light rays through its optics to its imaging plane. Summing the light rays in this imaginary image produces the desired photograph. This ray-tracing framework provides a general mechanism for handling the undesired non-convergence of rays that is central to the focus problem. What is required is imagining a camera in which the rays converge as desired in order to drive the final image computation."

Another light field image sensor is described is U.S. 2011/0174998, entitled Light Field Image Sensor, Method and Application, to Molnar, et al., which is incorporated by reference herein. Any suitable device that can capture light intensity and direction may be used or incorporated as part of the present invention.

There are several different types of solutions available today for capturing and processing machine-readable data, and these technology capabilities are summarized in Table 1. Some of the metrics in Table 1 are given ratings numbers, 1, 2 or 3, with 3 being the best and 1 being the worst. Included in Table 1 are the following types of technologies:

A Pen-type scanner uses emitted light and a single point sensor. The user moves the tip of the pen across a 1-D barcode at a relatively close range and at a relatively uniform speed. The dark bars absorb the light and the spaces between the bars reflect the light. The patterns of light and dark are captured by the point sensor and decoded into data. The advantages of a pen type scanner is that they are inexpensive and they comprise no moving parts. The disadvantages a pen type scanner are: only 1-D barcodes can be processed, dependent upon the speed at which the user scans the pen across the barcode, the tip of the pen must be relatively close to the code to be read, a light source must be provided, can only capture one barcode at a time, and cannot capture color information.

A single line laser scanner creates a line of light using a laser and moving optics. Reflected light is captured and decoded in a similar way as the pen-type reader. The advantages of a single line scanner are that it can easily read 1-D bar code and the distance between the sensor and the image can vary more than with a pen type solution. The disadvantages of a single line scanner are: more costly than a pen-type scanner, there is still enough sensitivity to the distance between the image and the sensor such that the user must often move the sensor back and forth along the optical axis of the system until the data is captured. This is often seen with the handheld sensors used in checkout lines, device must provide a light source (laser), the system can only tolerate rotation of the symbol to be read to the point where the laser line is still able to cross all of the lines of the barcode, cannot capture 2-D bar codes, cannot capture written language, cannot capture color information and may have trouble with colored surfaces (for example red lines on a white background will be difficult for a system using a red laser), has trouble with reflective surfaces because the laser will reflect back to the sensor, can only capture one barcode at a time.

A 1-D sensor has a row of pixels that can read a row of information in a single dimension, so it is able to read an entire 1-D barcode instantaneously. Other than the ability to use ambient light for the image capture, the device is similar to the single line laser scanner in its advantages and disadvantages.

A single line laser scanners with controlled movement is similar to a single line laser scanner except that an additional mechanical mechanism is required to change the relationship of the scan line with respect to the items to be scanned. This allows the system to scan a 2-D bar code and potentially allows it to capture bar codes in any orientation. The advantages of a single line laser scanners with controlled movement are: can capture 1-D and 2-D bar codes, the distance between the sensor and the image can vary more than with a pen-type solution, and symbols can be rotated in any orientation about the optical axis. The disadvantages of a single line laser scanners with controlled movement are: cannot capture written language, mechanical mechanism is more complicated than a pen-type scanner, a single line laser scanner and a 1-D sensor, the method of capture is slower than a pen-type scanner, a single line laser scanner and a 1-D sensor because of the mechanical movement required to obtain information in the second dimension, device must provide a light source (laser), sensitivity of the distance between the image and the sensor is the same as for a single line laser scanner and a 1-D sensor, cannot capture color information and may have trouble with colored surfaces (for example red lines on a white background will be difficult for a system using a red laser), and trouble with reflective surfaces because the laser will reflect back to the sensor.

An omni-directional laser scanner emits a pattern of light scanning lines that are able to cross all of the bars and spaces of the bar code regardless of the orientation. The scan lines are created using a laser and moving optics. This type of scanner is usually seen in supermarket checkouts to read 1-D barcodes. The advantages of an omni-directional laser scanner are: the distance between the sensor and the image can vary more than with a pen-type solution, symbols can be rotated in any orientation about the optical axis, speed of capture is approximately the same as for a single line scanner and a 1-D sensor scanner. The disadvantages of an omni-directional laser scanner are: mechanical mechanism is more complicated than a single line scanner, a 1-D sensor scanner and pen type scanner, device must provide a light source (laser), cannot capture written language, cannot capture 2-D barcodes, cannot capture color information and may have trouble with colored surfaces (for example red lines on a white background will be difficult for a system using a red laser), and it has trouble with reflective surfaces because the laser will reflect back to the sensor.

A 1-D sensor with controlled movement, is similar to a single line laser scanners with controlled movement except that is uses the 1-D sensor. This type of solution is often seen in flat-bed scanners and ATM's that read deposited checks and determine their value. The advantages of a 1-D sensor with controlled movement are: can capture many different types of machine readable data, the distance between the sensor and the image can vary more than with a pen-type solution scammer, although generally are implemented with optics that read at close range, symbols can be rotated in any orientation about the optical axis, and can use ambient light although many implementations provide their own light source. The disadvantages of a 1-D sensor with controlled movement are: cannot capture written language, mechanical mechanism is more complicated, and method of capture is slower than a single line scanner, a 1-D sensor scanner and pen type scanner, the sensitivity of the distance between the image and the sensor is the same as for a single line scanner, a 1-D sensor scanner.

A 2-D sensor based with fixed optics uses a sensor with a 2-D matrix of pixels and is able to capture 2-D information (barcodes, written language, etc.) with no moving mechanical parts. These sensors can easily capture information from a 2-D barcode and can also capture multiple barcodes simultaneously. The data can be captured in any rotation about the optical axis of the system. In addition, color information can be captured. The advantages of a 2-D sensor based with fixed optics are: distance between the sensor and the image can vary more than with a pen-type scanner, can capture all types of machine-readable information, symbols can be rotated in any orientation about the optical axis, speed of capture is faster than any other solution that is capable of capturing a 2-D image or written language, there are no moving mechanical parts required, which means it is more reliable over the long-term, and multiple barcodes can be captured simultaneously. The disadvantage of a 2-D sensor based with fixed optics is that there is still sensitivity to the distance between the image and the sensor, so the item to be read will need to be moved along the optical axis until the appropriate focus is achieved.

A 2-D sensor based with moving optics for auto-focus is similar to a 2-D sensor based with fixed optics except that there are moveable optics which allow the device to focus on the data to be read. The advantages of a 2-D sensor based with moving optics are: distance between the sensor and the image is more tolerant than any of the other solutions, symbols can be rotated in any orientation about the optical axis, and multiple bar codes can be captured simultaneously. The disadvantages of a 2-D sensor based with moving optics are: speed of capture is slower than a solution with fixed optics because of the time required to auto-focus on the image, and moving mechanical parts have more risk of failure.

Table 1, provided below, shows a list of scanner types across the top row and attributes or capabilities in the first column. As shown in Table 1, the light field instruction identifier, as described herein surpasses all other scanner types is attributes and capabilities.

TABLE 1

| | Pen Type | Single Line Laser Scanner | 1-D Sensor Based | Single Line Laser Scanner with Controlled Movement | Omni-directional laser scanner | 1-D sensor with controlled movement | 2-D sensor based with fixed optics | 2-D sensor based with moving optics for auto-focus | Light field sensor |
|---|---|---|---|---|---|---|---|---|---|
| Read 1-D Barcodes | Yes | Yes | Yes | Yes | Yes | Yes | Yes | Yes | Yes |
| Read 2-D Barcodes | No | No | No | Yes | No | Yes | Yes | Yes | Yes |
| Read Written Language (Hand-written and printed) | No | No | No | No | No | Yes | Yes | Yes | Yes |
| Read color data | No | No | Yes | No | No | Yes | Yes | Yes | Yes |
| Read data in any orientation about the optical axis | Yes | No | No | Yes | Yes | Yes | Yes | Yes | Yes |
| Read multiple barcodes simultaneously | No | No | No | Yes | No | Yes | Yes | Yes | Yes |
| Can use ambient light | No | No | Yes | No | No | Yes | Yes | Yes | Yes |
| High reliability because no moving mechanical parts | Yes | No | Yes | No | No | No | Yes | No | Yes |

TABLE 1-continued

| | Pen Type | Single Line Laser Scanner | 1-D Sensor Based | Single Line Laser Scanner with Controlled Movement | Omni-directional laser scanner | 1-D sensor with controlled movement | 2-D sensor based with fixed optics | 2-D sensor based with moving optics for auto-focus | Light field sensor |
|---|---|---|---|---|---|---|---|---|---|
| Speed | 2 | 2 | 2 | 1 | 3 | 1 | 3 | 2 | 3 |
| Tolerance of distance between sensor and image to be read | 1 | 2 | 2 | 2 | 2 | 2 | 2 | 3 | 3 |
| Tolerance of reflective surfaces | 1 | 1 | 3 | 1 | 1 | 3 | 3 | 3 | 3 |
| Tolerance of color bar codes | 3 | 2 | 3 | 2 | 2 | 3 | 3 | 3 | 3 |
| Evaluate 3D information from hologram | No | No | No | No | No | No | No | No | Yes |

The invention is directed to an article comprising an instruction symbol identifier comprising a digital image capturing feature comprising an aperture for receiving light and a light field sensor. A light field sensor captures the sum of light rays at each pixel, but also captures the angle of approach of the various rays, thereby effectively capturing 3-D information about the image. A light field sensor comprises a plurality of micro-lenses configured over a photosensor. A photosensor is an array of light sensitive elements, often referred to as pixels, whereby an array may be configured over an area, or configured in a linear fashion. The digital information collected by the digital imaging capturing system is analyzed by a computing device comprising a computer program that digitally focuses said digital image to recognize an instruction symbol. The computing device may correlate the identified symbol with some corresponding information, such as a sales price, quantity, address, and the like. In one embodiment, the computing device is couple to or configured with a sales register having corresponding sales price information related to an instruction symbol, such as a UPC or bar code.

An instruction symbol identifier, as described herein, may comprise one or more digital imaging capturing features, whereby a plurality of digital image capturing features may be configured at different angles to more effectively an quickly identify an instruction symbol. For example, in one embodiment, two digital image capturing features are configured with a point of sale counter; with one being configured with an aperture facing up from the counter, and another with an aperture facing across the counter. This configuration reduces the need to reorient sale items, especially large and/or heavy sale items, in order for the instruction symbol identifier to identify an instruction symbol. An digital image capturing feature, as described herein, comprises at least one light field sensor, and may comprises a plurality of light field sensors. A plurality of light field sensor may be configured with different orientations to incident light to the digital image capturing feature, and thereby allow for capturing two digital images, whereby one may be more aligned with an instruction symbol. In another embodiment, digital image data from two light field sensors may be analyzed by the computing device in conjunction with each other, in order to identify an instruction symbol.

The digital image capturing feature, as described herein, may comprise one or more optical lenses for focusing incident light. Furthermore, a digital image capturing feature may comprise a variable optics control feature, whereby the focus may be adjusted mechanically. For example, a variable optics control feature may change the focus as a function of the distance between the image sensor and the aperture of the digital image capturing feature. The instruction symbol identifier may further comprise a shutter that may open and close upon a user input, at regular intervals, or as a function of the proximate of an object to the digital image capturing feature. For example, a shutter may be configured over the aperture of a digital image capturing feature, and when an object moves with a certain distance of the aperture, the shutter opens and shuts to capture a digital image. The shutter may continue to open and shut at regular intervals, to capture digital images while the object is within a pre-determined distance, or until an instruction symbol is identified. The instruction symbol identifier may comprise a proximate sensor that will cause the digital image capturing feature to capture a digital image, and/or open a shutter when an object moves within a pre-determined distance from the proximate sensor.

The instruction symbol identifier may comprise a light emitting feature that may be coupled to, or be configured with, a digital image capturing feature. A light emitting feature may comprise any suitable type of light emitting element, including LED, laser, filament bulb type light, fluorescent light and the like. A light emitting feature may emit light continuously while the instruction symbol identifier is in use, such as while instruction symbols are being identified, or may emit light as a function of the digital image capturing feature. For example, a flash of light may be emitted when an aperture is opened to collect incident light into the digital image capturing feature.

A digital image capturing feature may be configured in any suitable way for the purposes of the desired use. For example, a digital image capturing feature may be mounted in a point of sale counter, along a side of a point of sale counter, or over a point of sale counter. In another embodiment, a digital image capturing feature may be configured in hand held device. In yet another embodiment, a digital image capturing feature may be configured along the side of a conveyor system, whereby objects, such as product or mail, are passed by the digital image capturing feature. In still another embodiment, a digital image capturing feature may be configured on a manipulator, such as a robotic arm, and may be manipulated either manual or by an automated control. A digital image capturing feature and computing device may be coupled together for the transfer of digital information by any suitable means including, but not limited to, an Ethernet cable, a USB cable, a coaxial cable and the like.

The instruction symbol identifier may comprise a wireless signal feature, that may be configured on a digital image capturing feature, or on a computing device as described herein. A wireless signal feature may produce and transmit a wireless signal that maybe received by a wireless signal receiver. The instruction symbol identifier may comprise a wireless signal receiver that may be configured on a digital image capturing feature or on a computing device, or may be part of an auxiliary component, such as a point of sail register. For example, a hand held type digital image capturing feature may comprise a wireless signal feature, whereby digital image information may be transferred wirelessly to a computing device. Likewise, a computing device as described herein, may comprise a wireless signal feature, whereby instruction symbol information may be transferred to, for example, a point of sale register, computer, database, portable electronic device, internet, and the like.

An instruction symbol may be any symbol that can be identified by the instruction symbol identifier described herein, including, but not limited to, machine readable data, universal product code UPC, bar code, alpha-numeric characters, text, numbers or symbols, written or printed text or numbers, a signature or any combination thereof. An instruction symbol may comprise alpha-numeric characters in any language form, including but not limited to, English, Chinese, Japanese, French, Spanish, German and the like. An instruction symbol may be printed on an article or label, or may be written. An instruction symbol may comprise one or more colors, or may be black and white, such as conventional bar codes. An instruction symbol may be located on a product for sale, manufactured articles, or on a box, container or package. In one embodiment, an instruction symbol is on an envelop and comprises an address or postal code. In still another embodiment, an instruction symbol may have three dimensional features, such as raised lettering, or may comprises a hologram. The digital image capturing feature, as described herein, having three dimensional image resolution capabilities, may be configured to identify an instruction symbol having three dimensional features, and/or a hologram.

An instruction symbol identifier may comprise an image locator feature that indicates the field of view of a digital image capturing feature. For example, a light may be emitted by an image locator feature that indicates the field of view. Any suitable light may be used, and the light may be emitted over the entire field of view area or may be emitted only over a portion of the field of view area, such an emitted light border. For example, an emitted light boarder may be light in the shape of a cross, or the perimeter/boarder of a square or circle. An image locator feature may project any suitable type of light including, but not limited to, a laser, incandescent, fluorescent, and the like. Furthermore, the emitted light from an image locator feature may comprise colored light.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
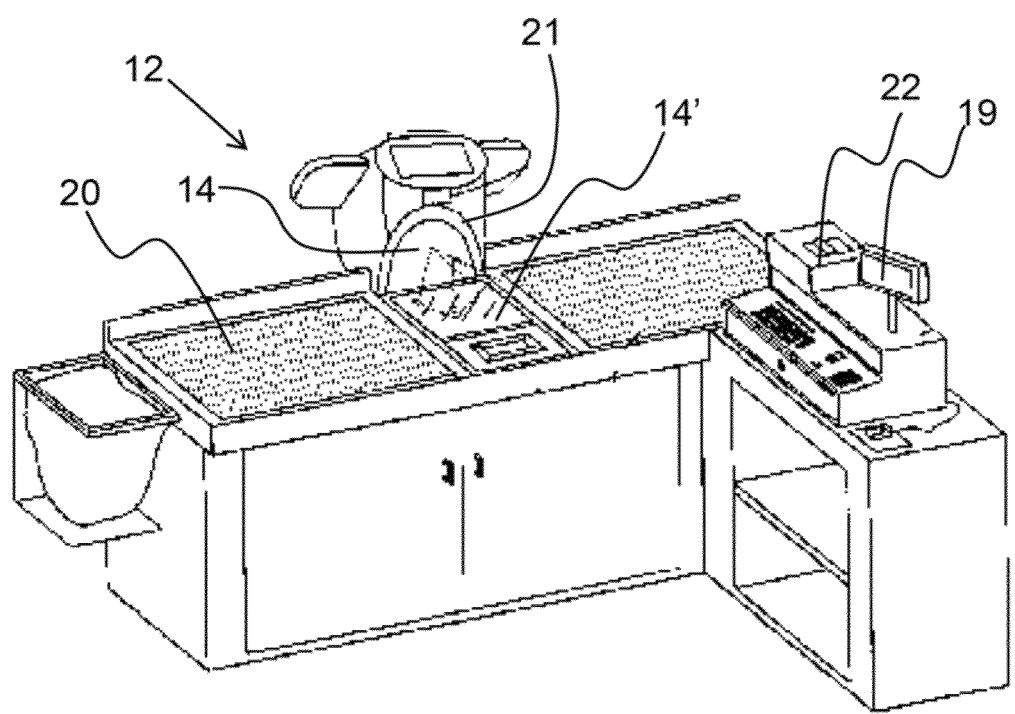

FIG. 1 shows a perspective view of a point of sale retail counter with a first instruction symbol identifier configured in the counter with an aperture facing up, and a second instruction symbol identifier configured along the side of the counter.

Figure 2A:
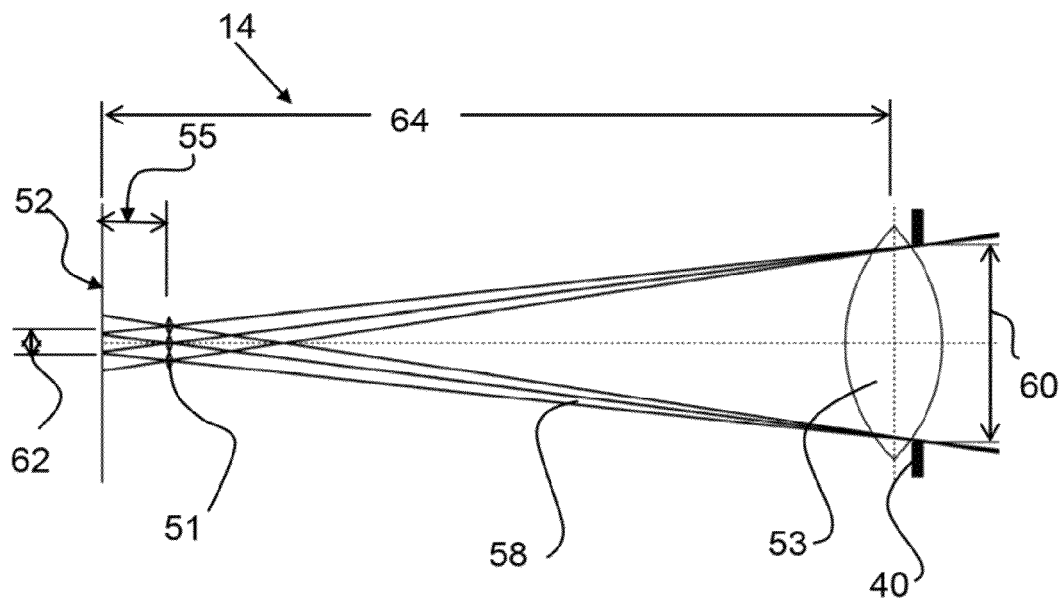

FIG. 2A shows a diagram of an exemplary light field camera image capturing configuration.

Figure 2B:
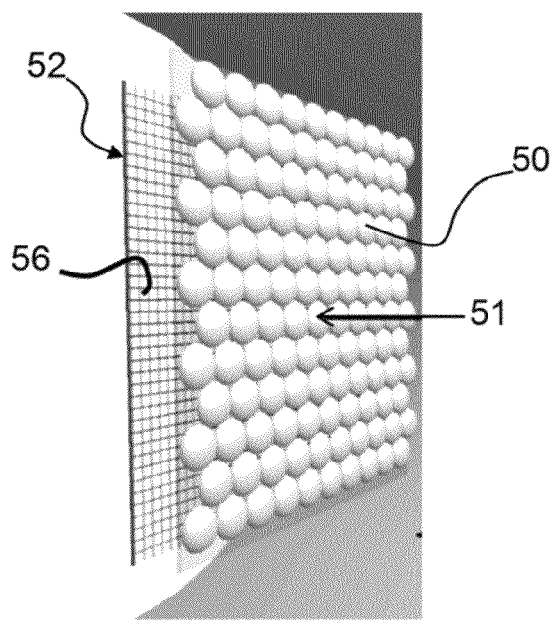

FIG. 2B shows an isometric view of a representation of a micro-lens array configured over a photosensor.

FIGS. 3A through 3F show examples of instruction symbols as described herein.

Figure 4:
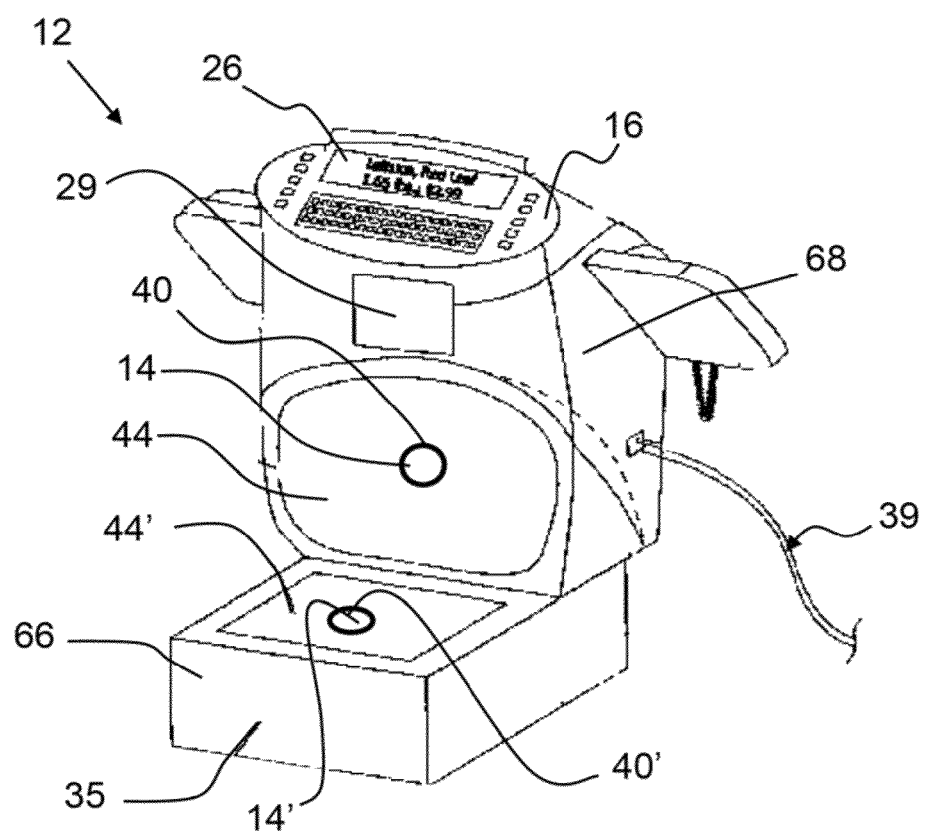

FIG. 4 shows a perspective view of an exemplary instruction symbol identifier.

Figure 5:
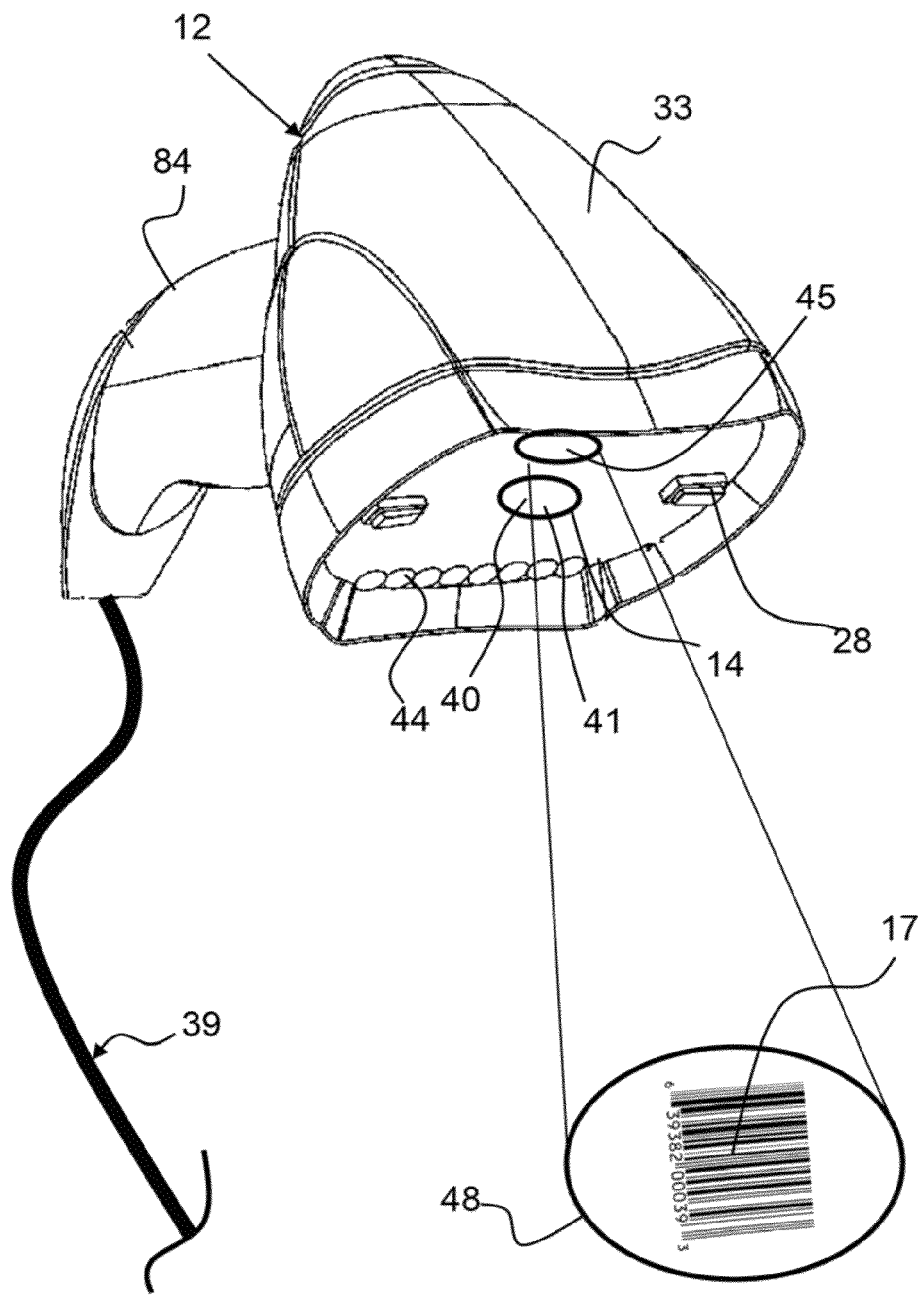

FIG. 5 shows a perspective view of an exemplary digital image capturing feature.

Figure 6:
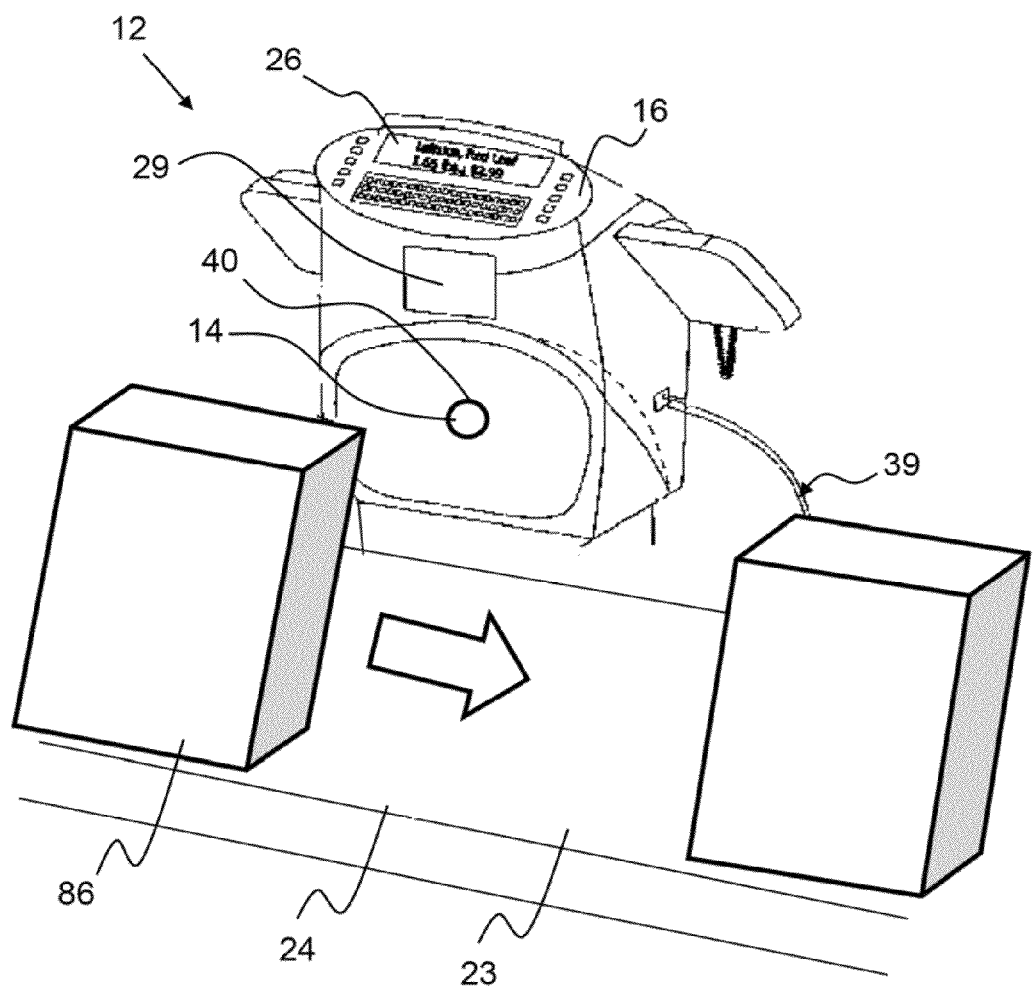

FIG. 6 shows a perspective view of an exemplary instruction symbol identifier configure on a manufacturing line.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

DEFINITIONS

Light field sensor, as used herein, is a sensor that measures both the intensity and direction of incident light. In one embodiment, a light field sensor comprises a plurality of micro-lenses and a photosensor.

Instruction Symbol (IS) article, as used herein, is any article containing an instruction symbol, including but not limited to products, product containers, manufactured articles, packages, letters, envelopes, tickets, coupons, checks, documents, credit cards, identification cards, and the like.

Proximate sensor, as used herein, is any type of sensor that detects the presence of an object including a proximity sensor, a light sensor, and the like.

As shown in FIG. 1 an instruction symbol identifier 12 may be configured with, or coupled to a point of sale counter 20. Two digital image capturing features are coupled to the point of sale counter, where a first digital image capturing features 14 is configured along the side of the counter with an aperture pointed across the counter and a second digital image capturing features 14' is configured under the counter with an aperture pointed up from the counter. The point of sale instruction symbol identifier 21 may be coupled to a register 22, whereby information, such as price may be transferred to the register. In another embodiment, the identity of the instruction symbol is transferred to a register or other computing device and related information about the identified instruction symbol may be correlated and further processes, such as being incorporated into a receipt.

FIG. 2A shows a diagram of an exemplary light field camera image capturing configuration, where the optical lens 55 is configured with inside an aperture 40, and where a micro-lens array 51 is configured over a photosensor 52. The light field gap 55 is the distance between the micro-lens array 51 and the image plane or photosensors 52. The light field gap may be constant or may be configured to change, whereby the micro-lens array may move further away, or closer to the photosensors. The diameter of the lens 60 as well as the diameter of the image at the image plane 62 are shown in FIG. 2A. Central projection rays 58, represent incident light moving through the digital image capturing feature 14 in FIG. 2A.

FIG. 2B shows an isometric view of a representation of a micro-lens array 51 configured over a photosensor 52. The micro-lens array is comprised of a plurality of micro-lenses 50 arranged over the photosensors. A single micro-lens covers a plurality of pixels 56. The micro-lenses may be arranged in any suitable way, including in a linear arrangement as shown in FIG. 2B, or nested in any other suitable way. In addition, the micro-lenses in a micro-lens array may all be the same, or may be different, such as having different dimensions including diameter and shape, or may comprise different materials. In one embodiment, a micro-lens array and photosensor are configured in a linear fashion, whereby an instruction symbol moving past the digital image capturing feature may be identified in a one dimensional manner, much like a laser scanner, except that the digital image capturing feature, as described herein has the capability to focus an image digitally.

FIGS. 3A through 3F show examples of instruction symbols as described herein. FIG. 3A shows an example of a universal product code (UPC), or bar code. A bar code is typically a plurality of black lines space in a specific way to represent something. A bar code, UPC or any of the other instruction symbols may comprise one or more colors. FIG. 3B shows an quick response (QR) code that comprises two dimensions arrangements of dark and light areas. FIG. 3C shows a product label having a plurality of different types of instruction symbols. In one embodiment, an instruction symbol identifier may read a product label that may be on a specific product or a product container, and thereby recognize the type of product and where it is to be shipped for example. FIG. 3D shows an example of a mail instruction symbol that may be used by a plurality of instruction symbol identifier to direct a piece of mail to a destination. FIG. 3E shows an example of a signature. An instruction symbol identifier may be used to recognize a signature on a check or other document. FIG. 3F shows an example of a check. An instruction symbol identifier may be used to identify the check account number, routing number, bank information, check amount, signature, date, and/or the signature. All of this information may be identified by an instruction symbol identifier when a user deposits of cashes a check in an automatic teller machine (ATM), for example. An instruction symbol identifier may be configure in an ATM, kiosk, or any other automated user interface device. FIG. 3G shows an example of currency. An instruction symbol identifier may be used to identify currency in the form of paper or coins.

FIG. 4 shows a perspective view of an exemplary instruction symbol identifier 12 having two digital image capturing features 14 and 14' configured in an enclosure 35. A first digital image capturing feature 14' is configured in the base portion 66 of the enclosure 35 and a second digital image capturing feature 14 is configured is the stand portion 68 of the enclosure. The first digital image capturing feature is configured with an aperture 40' facing up, and the second digital image capturing feature is configured with an aperture 40 facing across the base, or an ninety degrees from the direction of the first digital image capturing feature aperture. A light emitting feature 44 and 44' may be configured on an instruction symbol identifier as shown in FIG. 4. A light emitting feature may flash or provide a constant light source to improve the image identification performance of the instruction symbol identifier. Also shown in FIG. 4 is a display 26 that may show information related to the identification of an instruction symbol, such as price. A display may show any other suitable information, such as quantity, address, value, product codes, purchase total in currency and the like. An instruction symbol identifier may comprise a computing device 16 whereby information relevant to an instruction symbol may be computed or tabulated in some way. An instruction symbol identifier may further comprise a data coupling feature 39, as shown in FIG. 4, whereby instruction symbol information may be transferred to a secondary computing device 19, as shown in FIG. 1, such as a computer or database, or a register. A wireless receiver 29 is shown on the instruction symbol identifier in FIG. 4. A wireless signal receiver may be used to receive updates related to instruction symbols. For example, new prices for certain items may be changed from day to day, or within a day, such as a temporary special, and this new pricing information may be provided to the instruction symbol identifier through the wireless receiver 29, or through the data coupling feature 39.

FIG. 5 shows a perspective view of an exemplary digital image capturing feature that is configured as a hand held digital image capturing feature 33. A user may hold the hand held digital image capturing feature 33 by the handle 84 and point the aperture 40 at an instruction symbol. In some embodiment, a hand held digital image capturing feature 33 may comprise a button or switch to allow the user to activate the digital image capturing feature to capture an image either by means of an electronic signal to the sensor or the opening of a shutter 41. The hand held digital image capturing feature 33 is configured with a light emitting feature 44, shown as an array of lights, such as LED lights that may improve image capturing. In addition, the hand held digital image capturing feature comprises an image locator feature 45, that may project light corresponding to the field of view of the digital image capturing feature, or may project an emitted light boarder 48, as shown. The emitted light boarder 48 may be positioned over an instruction symbol 17, and a user may then press a trigger, button or switch, for example, to activate the digital image capturing feature to identify the instruction symbol. The hand held digital image capturing feature 33 shown in FIG. 5 comprises a data coupling feature 39 that may be used to transfer data to and from the hand held device and may also provide power to the hand held digital image capturing feature. In another embodiment, a hand held digital image capturing feature does not have a data coupling feature and is completely remote, and may comprise a wireless signal feature 28, as shown in FIG. 5, to send information related to an instruction symbol to a remote computing device 19, such as a register.

FIG. 6 shows a perspective view of an exemplary instruction symbol identifier 12 configure on a manufacturing line 24, where product containers 86 are moving past a digital image capturing feature 14 on an article conveyor 23. The digital image capturing feature 14 may be configured to be located where a instruction symbol is located on a product container. In this manner, a 1-D digital image capturing feature may be used. A conveyor belt or system may move any type of article past a digital image capturing feature configured to read an instruction symbol on the article, including products, product containers, shipping containers, mail or letters, and the like.

It will be apparent to those skilled in the art that various modifications, combination and variations can be made in the present invention without departing from the spirit or scope of the invention. Specific embodiment, features and elements described herein may be modified, and/or combined in any suitable manner. Thus, it is intended that the present invention cover the modifications, combination and variations of this invention provided they come within the scope of the appended claims and their equivalents.

What is claimed is:

1. An article comprising an instruction symbol identifier system comprising:
   a. a digital image capturing feature comprising;
      i. an aperture for receiving light;
      ii. an optical lens configured within said aperture;
      iii. a light field sensor comprising;
         1. a micro-lens array comprising a plurality of micro-lenses;
         2. a photosensor comprising a plurality of pixels;
      wherein said micro-lens array is configured closer to said aperture than said photosensor by a light field gap, wherein said light field sensor is positioned between one and two focal lengths from said aperture, wherein said light field gap is no more than two focal lengths of the micro-lens array, and wherein said light field sensor captures light intensity and light direction;
   b. a computing device, coupled to said digital image capturing feature, comprising;
      i. a computer program,
   wherein said computer program of the instruction symbol identifier system digitally focuses said digital image using said light intensity and light direction in a ray-tracing technique to identify an instruction symbol and correlate said identified instruction symbol with corresponding information.

2. The article of claim 1, wherein the digital image capturing feature comprises a plurality of light field sensors.

3. The article of claim 1, wherein the instruction symbol identifier system further comprises a shutter.

4. The article of claim 1, wherein the instruction symbol identifier system further comprises a light emitting feature.

5. The article of claim 1, wherein the digital image capturing feature is a hand held digital image capturing device.

6. The article of claim 1, wherein the instruction symbol identifier system further comprises a proximate sensor, whereby a digital images is captured by the digital image capturing feature when an object triggers the proximate sensor.

7. The article of claim 6, wherein the digital image capturing feature captures a plurality of images after the proximate sensor is triggered until an instruction symbol is identified.

8. The article of claim 1, wherein the instruction symbol comprises a bar code.

9. The article of claim 1, wherein the instruction symbol is a written instruction symbol.

10. The article of claim 1, wherein the instruction symbol comprises an instruction symbol having three-dimensional features.

11. The article of claim 1, wherein the instruction symbol comprises a hologram.

12. The article of claim 1, further comprising a wireless signal feature, whereby the instruction symbol identifier produces a wireless signal that is configured to be received by a wireless receiver.

13. The article of claim 1, wherein the instruction symbol identifier system further comprises a wireless receiver.

14. The article of claim 1, wherein the instruction symbol identifier system further comprises a data coupling feature.

15. The article of claim 1, wherein the instruction symbol identifier is a point of sale instruction symbol identifier and the corresponding information is a sales price.

16. The article of claim 1, wherein the digital image capturing feature is configured on a conveyor, having articles moving past a digital image capturing feature.

17. The article of claim 1, wherein the digital image capturing feature is configured on a manipulator.

18. The article of claim 1, further comprising an image locator feature wherein the image locator feature comprises an emitted light indicating the field of view of the digital image capturing feature.

19. The article of claim 18, wherein the image locator feature is configured to emit a light border.

20. The article of claim 1, further comprising a display.

21. An article comprising an instruction symbol identifier system comprising:
   a. a digital image capturing feature comprising;
      i. an aperture for receiving light;
      ii. an optical lens configured within said aperture;
      iii. a light field sensor comprising;
         1. a micro-lens array comprising a plurality of micro-lenses;
         2. a photosensor comprising a plurality of pixels;
      wherein said micro-lens array is configured closer to said aperture than said photosensor by a light field gap, wherein said light field sensor is positioned between one and two focal lengths from said aperture, wherein said light field gap is no more than two focal lengths of the micro-lens array, and wherein said light field sensor captures light intensity and light direction;
   b. a computing device, coupled to said digital image capturing feature, comprising;
      i. a computer program;
   wherein said computer program digitally focuses said digital image using said light intensity and light direction in a ray-tracing technique to identify an instruction symbol and correlate said identified instruction symbol with a sales price; and
   c. a data coupling feature;
   wherein said instruction symbol identifier system is a point of sale instruction symbol identifier system, and wherein said data coupling feature transfers data from said instruction symbol identifier to a secondary computing device.

22. The article of claim 21, wherein the instruction symbol identifier system comprises a hand held digital image capturing feature.

\* \* \* \* \*